US009501361B2

(12) United States Patent
Bates

(10) Patent No.: US 9,501,361 B2
(45) Date of Patent: Nov. 22, 2016

(54) DISASTER RECOVERY SYSTEM

(71) Applicant: Silverstring Ltd., Banbury (GB)

(72) Inventor: Richard Douglas Bates, Warwickshire (GB)

(73) Assignee: Silverstring Ltd., Banbury (GB)

( * ) Notice: Subject to any disclaimer, the term of this patent is extended or adjusted under 35 U.S.C. 154(b) by 165 days.

(21) Appl. No.: 14/498,009

(22) Filed: Sep. 26, 2014

(65) Prior Publication Data

US 2016/0092308 A1 Mar. 31, 2016

(51) Int. Cl.
*G06F 11/07* (2006.01)
*G06F 11/10* (2006.01)
*G06F 11/14* (2006.01)
*G06F 11/16* (2006.01)
*G06F 11/20* (2006.01)

(52) U.S. Cl.
CPC ......... *G06F 11/1092* (2013.01); *G06F 11/142* (2013.01); *G06F 11/1464* (2013.01); *G06F 11/1469* (2013.01); *G06F 11/1658* (2013.01); *G06F 11/2025* (2013.01); *G06F 11/2028* (2013.01); *G06F 11/2041* (2013.01); *G06F 11/2048* (2013.01)

(58) Field of Classification Search
CPC .................................................. G06F 11/1092
USPC ......................................................... 714/6.24
See application file for complete search history.

(56) References Cited

U.S. PATENT DOCUMENTS

| 8,694,822 B2* | 4/2014 | Radhakrishnan ... G06F 11/0709 714/4.1 |
| 2011/0258481 A1 | 10/2011 | Kern |
| 2011/0320591 A1* | 12/2011 | Ozaki ..................... H04L 41/06 709/224 |
| 2012/0117422 A1 | 5/2012 | Radhakrishnan |
| 2012/0203742 A1 | 8/2012 | Goodman et al. |
| 2013/0091376 A1* | 4/2013 | Raspudic ............ G06F 11/1484 714/3 |
| 2013/0111260 A1 | 5/2013 | Reddy et al. |
| 2013/0152047 A1* | 6/2013 | Moorthi ................ G06F 11/368 717/124 |
| 2014/0006357 A1* | 1/2014 | Davis .................. G06F 11/1464 707/667 |
| 2014/0040206 A1* | 2/2014 | Ramakrishnan .... G06F 11/2097 707/640 |
| 2014/0040999 A1* | 2/2014 | Zhang ..................... G06F 21/31 726/5 |

(Continued)

FOREIGN PATENT DOCUMENTS

CN 103841177 A * 6/2014

OTHER PUBLICATIONS

Search Report and Written Opinion corresponding to PCT/GB2015/052753/050413 dated Dec. 16, 2015.

*Primary Examiner* — Chae Ko
(74) *Attorney, Agent, or Firm* — Kilpatrick Townsend & Stockton LLP

(57) ABSTRACT

Disclosed herein is a computer implemented method of performing recovery for a customer server system that has an associated backup of server system data of the customer server system, the method comprising the steps of: receiving a server recovery request at a portal for a rebuild of at least part of the customer server system; and, sending a request from the portal to a cloud-based data center for on-demand provisioning of cloud-based server resources, wherein the request includes information on the location of at least part of the backup of the server system data to enable the deployment of a rebuild of at least part of the customer server system at the cloud-based data center. Advantages include a user being able to easily manage disaster recovery testing as well as actual live recovery operations. The use of temporary servers in the cloud is an efficient, and inexpensive, use of resources as the servers can be rented and used only when required.

29 Claims, 9 Drawing Sheets

(56) References Cited

U.S. PATENT DOCUMENTS

| | | | |
|---|---|---|---|
| 2014/0089736 A1* | 3/2014 | Okada | G06F 11/2736 714/31 |
| 2014/0189432 A1* | 7/2014 | Gokhale | G06F 17/30289 714/41 |
| 2014/0310509 A1* | 10/2014 | Potlapally | G06F 21/57 713/2 |
| 2014/0310510 A1* | 10/2014 | Potlapally | G06F 11/1446 713/2 |
| 2015/0039930 A1* | 2/2015 | Babashetty | G06F 11/1464 714/4.11 |
| 2015/0254142 A1* | 9/2015 | Wagmann | G06F 11/1464 714/19 |
| 2015/0331758 A1* | 11/2015 | Durge | H04L 67/10 707/640 |

* cited by examiner

FIG. 9

DISASTER RECOVERY SYSTEM

FIELD

Embodiments of the present invention relate generally to disaster recovery of server systems. More particularly, an improved disaster recovery system is provided that allows easy, quick and cost efficient disaster recovery provision and testing of all or part of a server system.

BACKGROUND

The generation, use and management of Big Data are increasingly important issues. These issues need to be addressed by numerous organisations that obtain, and are required to store, a large and ever increasing amount of data every day. The stored data is used by the server systems of the organisations for a wide variety of purposes, such as conducting transactions and the management of goods and personnel. The server systems need to be both configured to perform specific tasks and also to be able to retrieve the stored data required to perform these tasks from one or more large databases. The failure of a server system, or part of a server system, and the loss of any data, will result in a loss of service. For some organisations, a loss of service for any length of time may be unacceptable and result in considerable financial and other loss to the organisation. In particular, any irrecoverable data loss may cause severe harm to an organisation.

To help prevent losses due to server downtime or irrecoverable data loss, it is normal for organisations to regularly backup all of their server systems. If an organisation's servers and/or databases are damaged due to a disaster occurring, such as a fire or flood, malicious act or human error, then a disaster recovery, DR, operation is performed. A full DR operation will typically involve obtaining a recent backup of the data, providing a replacement server system with appropriately configured servers, recovering the data and using the replacement server system to perform the tasks of the original server system.

A number of problems are experienced by known approaches to the provision of a DR operation.

Due to the very large data storage requirements, the backup of the data in an organisation's databases is usually stored on a plurality of reels of magnetic tape. These are then transported offsite to a vault in a secure location where they are safely stored for retrieval if ever required for a DR operation. A full DR operation from a total loss of data requires performing the manual operations of finding and retrieving the necessary tapes from the vault as well as obtaining, configuring and restoring the data to a replacement server system. The entire DR process may take days, which is an unacceptable loss of service time for most organisations. In many situations the entire DR process has also not been tested so the DR effectiveness of the DR process is unknown. DR is normally performed at either a second data centre belonging to an organisation or at a DR provider who provides syndicated server equipment on a multi-year contract basis.

To achieve faster DR operation, it is also known for organisations to alternatively use one or more disk based backup systems rather than offsite tape storage. The use of disk based backup system can be more expensive than the use of tapes. However, a backup disk allows more of the DR operations to be automated and for parallel restores of multiple server systems. Where disk based backup is used then a second offsite copy is maintained by replicating the disk containing the backup data on the site where the organisation's servers are located to a second site with equivalent disk space, connected to a backup system.

A known data protection and recovery system that is widely used is the IBM® Tivoli® Storage Manager, referred to herein as TSM. It should be noted that TSM is not a full DR system, but only a backup system that permits an organisation to recover their data either onsite or at a DR site. Services provided by TSM include tracking and managing the retention of data from organisations, providing centralised data protection, to assist with the retrieval of previously backed up and archived data and to allow for local site recovery and DR operations at second site. An overview of the services TSM provides, how TSM works and the structure of a TSM system can be found at http://www.redbooks.ibm.com/redbooks/pdfs/sg248134.pdf, as viewed on 12 Sep. 2014.

TSM, and other known data protection systems, provides both tape based and disk based data backup and so experiences at least some of the above-identified problems. Furthermore, whilst suites such as TSM are extremely powerful, their use in an organisation of any significant size quickly becomes very complex and requires active management. Experts are therefore required to configure and manage the data protection system and develop and test bespoke data protection policies and recovery procedures. Known data protection solutions and DR contracts with third party organisations can also be expensive for an organisation. DR resources are being paid for when they may never be needed or even tested.

In addition, in order for an organisation to have confidence that they have an effective DR system in place, it is preferable to be able to test all or any part of a DR system by building one or more replacement server systems with the correct configuration and data. However, to reliably, quickly and easily perform such a DR test in an inexpensive manner is not possible with known DR systems.

SUMMARY

According to a first aspect of the invention, there is provided a computer implemented method of performing recovery for a customer server system that has an associated backup of server system data of the customer server system, the method comprising the steps of: receiving a server recovery request at a portal for a rebuild of at least part of the customer server system; and, sending a request from the portal to a cloud-based data centre for on-demand provisioning of cloud-based server resources, wherein the request includes information on the location of at least part of the backup of the server system data to enable the deployment of a rebuild of at least part of the customer server system at the cloud-based data centre.

Preferably, the received server recovery request comprises the metadata of the backup of server system data and/or a provisioning script for building at least part of a replacement server system.

Preferably, the portal is remote from the source of the received request and the cloud-based data centre.

Preferably, the source of the received request is the customer server system or a backup system comprising the backup of server system data.

Preferably, the customer server system and/or the backup system are cloud-based server systems.

Preferably, said step of sending a request from the portal to a cloud-based data centre comprises sending the request to the cloud-based data centre via an API of a cloud provider of the cloud-based data centre.

Preferably, the method further comprises determining, by the portal, a plurality of cloud-based data centres for providing cloud-based services.

Preferably, the method further comprises sending, by the portal to the source of the received request, identification information of each of the determined cloud-based data centres.

Preferably, the method further comprises receiving, by the portal from the source of the received request, data identifying one of the determined cloud-based data centres; and determining to send said request from the portal to a cloud-based data centre to said identified one of the determined cloud-based data centres.

Preferably, the customer server system comprises a plurality of groups of server systems, each group of server systems comprising one or more server systems; and said received server recovery request at the portal for a rebuild of at least part of the customer server system is a request for a rebuild of only the server systems in a selected one or more of the groups.

Preferably, the customer server system comprises one or more server systems with each server system having an associated service level; the method further comprising: obtaining, by the portal, the service levels of all of the one or more server systems identified in the received server recovery request at the portal for a rebuild of at least part of the customer server system; and rebuilding said at least part of the customer server system in dependence on the obtained service levels such that the rebuilding of a server system with a higher service level is prioritised over the rebuilding of a server system with a lower service level.

According to a second aspect of the invention, there is provided a portal configured to perform the method of the first aspect.

According to a third aspect of the invention, there is provided a computer implemented method of performing recovery for a customer server system that has an associated backup of server system data of the customer server system, the method comprising the steps of: sending a server recovery request to a portal for a rebuild of at least part of the customer server system; receiving, from a cloud-based data centre for on-demand provisioning of cloud-based server resources, a request for at least some of the backup server system data; and sending, in response to receiving the request from the cloud-based data centre, a copy of the requested backup server system data to the cloud-based data centre to enable the deployment, at the cloud-based data centre, of a rebuild of at least part of the customer server system.

Preferably, the sent server recovery request comprises the metadata of the backup of server system data and/or a provisioning script for building at least part of a replacement server system.

Preferably, the customer server system is remote from the portal and the cloud-based data centre.

Preferably, said steps of sending a server recovery request to a portal, receiving a request for at least some of the backup server system data and sending a copy of the requested backup server system data to the cloud-based data centre, are performed by the customer server system or a backup system comprising the backup of server system data.

Preferably, the customer server system is a cloud-based server system.

Preferably, the method further comprises receiving, from the portal, identification information of each of a plurality of cloud-based data centres for providing cloud-based resources.

Preferably, the method further comprises sending, to the portal, data identifying one of the plurality of cloud-based data centres.

Preferably, the customer server system comprises a plurality of groups of server systems, each group of server systems comprising one or more server systems, the method further comprising receiving a selection of one or more of the groups; wherein said sending of a server recovery request to a portal for a rebuild of at least part of the customer server system is a sending of a server recovery request for a rebuild of only the server systems in said selected one or more of the groups.

Preferably, the customer server system comprises one or more server systems with each server system having an associated service level; the method further comprising: providing, by the customer server system and/or a backup system comprising the backup of server system data, the service levels of all of the one or more server systems to be rebuilt by the cloud-based data centre to the portal and/or cloud-based data centre.

Preferably, the method further comprises: determining that a fault may potentially occur within at least part of the customer server system; determining that a rebuild of said at least part of the customer server system is required in dependence on the determination that a fault may potentially occur; and generating a server recovery request for the rebuilding of said determined at least part of the customer server system; wherein said sending of a server recovery request to a portal for a rebuild of at least part of the customer server system is the sending of said generated server recovery request for the rebuilding of said determined at least part of the customer server system.

According to a fourth aspect of the invention, there is provided a customer server system and/or a backup system of a customer server system configured to perform the method of the third aspect.

According to fifth aspect of the invention, there is provided a computer implemented method of performing recovery for a customer server system that has an associated backup of server system data of the customer server system, the method comprising a cloud-based data centre for on-demand provisioning of cloud-based server resources performing the steps of: receiving a request for a rebuild of at least part of the customer server system, wherein the request includes information on the location of at least part of the backup of the server system data; sending, in dependence on information obtained from the received request, a request for at least some of the backup of server system data; receiving the requested backup of server system data; and rebuilding at least part of the customer server system, at the cloud-based data centre, in dependence on the received backup of server system data and the information in the received request.

Preferably, said received request for a rebuild of at least part of the customer server system is sent from a portal remote from the cloud-based data centre and received via an API of a cloud provider of the cloud-based data centre.

Preferably, said step of sending a request for at least some of the backup of server system data comprises sending the request to the customer server system or to a backup system comprising the backup of server system data.

Preferably, the received request for a rebuild of at least part of the customer server system comprises the metadata of the backup of server system data and/or a provisioning script for building at least part of a replacement server system.

Preferably, the request for at least some of the backup of server system data is sent to a cloud-based server system.

Preferably, the customer server system comprises a plurality of groups of server systems, each group of server systems comprising one or more server systems; and said received request for a rebuild of at least part of the customer server system is a request for a rebuild of only the server systems in a selected one or more of the groups.

Preferably, the customer server system comprises one or more server systems with each server system having an associated service level; the method further comprising: the cloud-based data centre rebuilding said at least part of the customer server system in dependence on the service level(s) of the one or more server systems being rebuilt such that the rebuilding of a server system with a higher service level is prioritised over the rebuilding of a server system with a lower service level.

According to a sixth aspect of the invention, there is provided a cloud-based server system configured to perform the method of the fifth aspect.

According to a seventh aspect of the invention, there is provided a computer implemented method of performing recovery for a customer server system that has an associated backup of server system data of the customer server system, the method comprising: a customer server system and/or a backup system of a customer server system performing the method of the third aspect; a portal performing the method of the first aspect; and a cloud-based server system performing the method of the fifth aspect.

According to an eighth aspect of the invention, there is provided a system for performing recovery for a customer server system that has an associated backup of server system data of the customer server system, the system comprising: a customer server system and/or a backup system of a customer server system as set out in the fourth aspect; a portal as set out in the second aspect; and a cloud-based server system as set out in the sixth aspect.

LIST OF FIGURES

FIG. 1 shows a DR system according to an embodiment of the invention;
FIG. 2 shows a DR system according to an embodiment of the invention;
FIG. 3 shows a process according to an embodiment of the invention;
FIG. 4 shows a process according to an embodiment of the invention;
FIG. 5 shows a process according to an embodiment of the invention;
FIG. 6 shows a screenshot according to an embodiment of the invention;
FIG. 7 shows a screenshot according to an embodiment of the invention;
FIG. 8 shows a screenshot according to an embodiment of the invention; and
FIG. 9 shows a screenshot according to an embodiment of the invention;

DESCRIPTION

Embodiments of the invention provide a DR system that improves known DR systems and solves at least some of the above-identified problems.

The DR system according to embodiments makes use of cloud-computing resources. In order to perform a DR operation, or test the DR capability of all or part of an existing server system, a replacement server system is constructed in the cloud and used on an on-demand basis.

Embodiments provide DR for an organisation's server system. This may be any type of server system and its associated data. It includes both server systems that contain databases as well as server systems that do not.

The DR system according to embodiments supports systems that have backup systems onsite with their main server system, remote or cloud-based backup systems as well as backup replication systems. The DR system also supports multi-tenancy backup systems that support a plurality of organisations sharing the same backup system.

The sending of backup data from the main server systems to the backup database systems is configured to automatically occur on a frequent basis. In common with known systems, the automatic backup process is scheduled by a master backup server.

Embodiments include a DR portal that automates the tasks of one or more DR system engineers. The DR portal obtains metadata of an organisation's server systems as well as any other required data. The DR portal is also in communication with the application interfaces, APIs, of a cloud-computing provider. The DR portal uses the obtained data and communication with the cloud-computing provider to automatically configure the cloud-based servers and manage the DR operations.

The DR portal is able to operate with any cloud provider. The cloud provider may be public, private, hybrid or any infrastructure provider which permits server provisioning via CLI, Web service, API call or any other server provisioning techniques. There are number of companies that provide suitable cloud-based resources. These include Softlayer®, Amazon® Web Services, Microsoft® Azure, Google® compute and a generic OpenStack integration.

Advantageously, an organisation needs only to support a small DR client on their system to collect data for use in a DR operation. An organisation can access the DR portal and thereby easily manage DR testing as well as actual live recovery operations. The use of temporary servers in the cloud is an efficient, and inexpensive, use of resources as the servers can be rented and used only when required.

Further advantages of embodiments will become apparent from the more detailed description of embodiments provided below.

FIG. 1 shows a DR system according to a first embodiment of the present invention. The block 101 represents the main server systems of an organisation, referred to as Organisation A. Cloud A is a cloud-based data centre that comprises a backup of the server systems of Organisation A. Clouds B, C and D are also cloud-based data centres. The data centres may be located anywhere. For example, Clouds A, B, C and D may respectively be located in London, Singapore, Dallas and Amsterdam. Clouds A, B, C, D and Organisation A are all networked together and may communicate using any known communication techniques over networks.

Server systems within any of Clouds A, B, C and D may be rented and used on an on demand basis by Organisation A. These cloud-based data centres need not necessarily be remote from the Organisation A and one of the cloud-based data centres may be located onsite with the main server system of Organisation A.

In order to perform a DR operation, it is determined to configure one or more server systems within one of Clouds A, B, C and D as a replacement server system. The chosen data centre may be the data centre that rents their services at the cheapest rate or the choice may be based on technical considerations. The first choice of cloud-based data centre for using in a DR operation would normally be the cloud-based data centre where the backup system is located, i.e. Cloud A. However, any of Clouds A, B, C and D may be selected for a DR operation as Cloud A may have insufficient resources for the DR operation or be too expensive. In the presently described implementation of the first embodiment, Cloud D has been selected for providing a replacement server system.

One or more server systems within Cloud D are rented and configured as required. The data required for these to operate as a replacement server system is then transferred from Cloud A to Cloud D.

Advantageously, a replacement server system is quickly and easily built at Cloud D.

The above described operation may be performed either during an actual DR situation or, more likely, during DR testing. For DR testing, all or any part of the organisation's existing server system is provisioned and recovered in the cloud. The main purpose of the recovery is to determine that it is possible to build an effective and correct replica server system if ever required. A recovered server also has uses for testing purposes, such as when implementing a software upgrade, so that any problem that the software upgrade might cause can be determined before performing the software upgrade on the existing live server system.

FIG. 2 shows the DR system of the first embodiment in more detail.

Blocks 102 and 105 of FIG. 2 respectively correspond to Clouds A and D in FIG. 1. FIG. 2 also comprises a DR portal, a cloud API and cloud portal (all not shown in FIG. 1). The DR portal is provided by the systems of a DR support service provider and may be located remotely from Cloud A and the Cloud API. Clouds A, D, Organisation A, DR portal and cloud API are all networked together and may communicate using any known communication techniques over networks.

The cloud portal supports an interface used for standard access operations to Cloud D, as would be used by other applications than those according to the embodiments described herein. Advantageously, the direct communication between the DR portal and the cloud API allows the cloud portal to be bypassed by users who have been provided with access to the DR portal. Users of the DR system according to embodiments therefore operate through a single DR interface of the DR portal.

Cloud A comprises a backup system containing backed up server system data, a database controlling the backup system and a DR client that extracts metadata from the database of the backup system. The DR client obtains the metadata of the backup data stored in the Cloud A backup system. The metadata comprises information on what backup data can be found, and where it is, in the backup system. The obtained metadata is transmitted to the DR portal.

Preferably, a provisioning script is also obtained that provides information on the main server system configuration of Organisation A. This information is required by the DR portal so that a similar replacement server system can be automatically configured, i.e. provisioned, in the same manner as the existing main server system. The provisioning script is obtained and sent, i.e. uploaded, to the DR portal by the main server systems of Organisation A. All or any part of the provisioning script may have been automatically generated by the server systems of Organisation A or by manually entered by a user.

A provisioning script is a series of commands that can be run on a replacement server. For example if the replacement server is Microsoft Windows, then the provisioning script could be of type powershell, batch/command file, vb script and so on. Likewise if the replacement server is Linux, then the provisioning script could support OS shell language (e.g. sh, ksh, csh, bash etc). Anything that can be typed at a command line can be included in a provisioning script. A provisioning script would typically include commands for:
1) downloading of software from a repository
2) downloading of additional (configuration) files from the DR portal
3) downloading of license files for software
4) installation of software
5) configuration of software
6) commands to report provisioning status back to the DR portal
7) configuration of operating services
8) networking configuration
9) security configuration
10) active directory configuration
11) drive and volume configuration
12) recovery of data from the backup system provider
13) optional setup of new backups to the backup system provider The provisioning script, which may include other scripts and files from those listed above, is effectively the entire collection of steps that would normally be performed manually on a server if performing a DR operation according to known techniques in order to bring the server into operational use.

The uploading of the provisioning script to the DR portal may be configured to occur automatically or it may be only uploaded in response to a specific command from a user. Other scripts and/or files for aiding a DR operation may also be automatically, or manually by a user, uploaded to the DR portal.

In the DR portal, one or more recovery capsules are created that store the data received by the DR portal for use in DR operations. The information comprised in each recovery capsule may include the metadata obtained by the DR client, a list of servers that have been backed up to the backup database systems, a provisioning script and zero or more additional files. Each recovery capsule may also include management information about server backups, such as their status, size, duration and the storage occupancy and any other information that may be required for a DR operation. Preferably, one or more recovery capsules are created for each server that has been backed up to the backup provider. Each recovery capsule provides a useful encapsulation of all of the information necessary for the recovery of all, or part of, one or more server systems in a cloud-based data centre.

As explained above, the DR portal is provided by the systems of a DR support service provider and may be located remote from all of the other systems shown in FIG. 2. The purpose of the DR portal is to manage and set up actual DR operations and tests. The DR portal stores one or more recovery capsules that comprise the information required for the recovery of an organisation's server systems in a cloud-based data centre of a cloud provider. The DR portal for an organisation should run continuously and indefinitely until it is cancelled.

The DR portal may obtain from the recovery capsules information on all or any of CPU, disk, and memory requirements; cloud recovery provider and data centre location; operating system; a server provisioning script and additional files. The CPU, disk and memory resource requirements may be estimated from information that is available on the backup provider's central backup servers. Although this is an estimate rather than an accurate determination, the estimate may be sufficient for performing a quick DR test without having to obtain accurate information from a backed up server itself.

If multiple recovery capsules exist per backed up server then this allows recoveries to be performed in a variety of ways, at a variety of costs or to a variety of cloud providers. For example, there may be a TEST recovery capsule for a server which uses minimal resources (i.e. CPU, memory, disk and uptime) to keep costs down. There may also be a LIVE recovery capsule for a server which uses the correct amount of resources necessary for the recovery and production running of the server with live users in an actual DR situation.

The obtained information from the recovery capsules is for aiding the operation of the DR portal when managing a DR process. It is the DR portal that controls the DR process and, although the DR portal will normally determine to perform a DR process in dependence on the information from a recovery capsule, the DR portal is free to choose any location and type of server for a DR operation without being restricted to the information obtained from recovery capsules. This allows the DR portal to flexibly integrate and operate with cloud providers.

The DR portal is in direct communication with the APIs of the providers of the clouds. The DR portal is able to communicate with the server systems of any of Clouds A, B, C and D through their APIs.

A user of the DR system is provided with an interface to the DR portal. The user is given the option of performing a DR operation, including a test restore of an organisation's server systems, using all or any part of the data backed up to the backup system provided by Cloud A. The DR portal automatically obtains quotes and/or performance information from the available clouds, i.e. Clouds A, B, C and D. Preferably, the DR portal comprises logic that determines the cheapest of a plurality of cloud-based data centres. The cheapest cloud-based data centre may be determined, for example, in response to receiving a request for a rebuild of a server system, as a continuously run process or following a process that is performed daily. The DR portal effectively acts as a broker for resources. If the costs of the cloud-based data centres change in a way that affects a DR operation that is in progress, the DR portal may inform a user of this change so that the user can decide to change the resources used, or the DR portal may be configured to automatically change the used resources to minimise costs, without further user instruction being required.

All the necessary code and logic for cloud integration is provided in a separate abstracted layer in the DR portal. The DR portal displays a clear and easy to understand selection of cloud providers to a user. In the present description of this embodiment, the user selects Cloud D. All of these DR operations may alternatively be configured to be performed automatically, using the information in a recovery capsule, without user instruction.

The DR portal automatically determines how to configure one or more server systems of Cloud D using the data in the one or more recovery capsules. The DR portal then communicates with the server systems within Cloud D via the Cloud API. The server systems of Cloud D use the information received from the DR portal, that may include a server provisioning script and additional files, to automatically configure its servers as well as to find and retrieve the required backup data from Cloud A. The server systems in Cloud D may obtain the required backup data from Cloud A by generating and sending one or more requests for the data to the backup system in Cloud A. The backup system in Cloud A then sends the requested data to Cloud D in response to the received one or more requests from the server systems in Cloud D. The one or more requests sent from the server systems in Cloud D to obtain the backup data may be sent directly to the backup system or sent to the main server systems of Organisation A that then forwards the one or more requests to the backup system. Preferably, the requests are sent directly to the backup system as in an actual DR situation the main server systems of an organisation may not be operational.

The communication of the requests, and backed up data from Cloud A to Cloud D, may be via any suitable communication path and does not need to be via the DR portal.

Preferably, when the provisioning of server resources is occurring, and/or the provisioning script is being executed, then a real-time status report is generated by, and sent from, the server systems of Cloud D to the DR portal for display to a user. It is therefore clear to the user of the DR portal at what stage the recovery process is at for multiple servers at a time. The status is retained in the DR portal so all previous recoveries, their costs and status can be viewed.

Preferably the recovery of server systems occurs to the same cloud as the backup system, i.e. Cloud A in FIG. 2, in order to achieve high performance data restores.

Advantageously, the DR portal provides a single and easy to use interface to the organisation's users for DR operations.

The data that is automatically provided to the DR portal allows the server systems and databases of Cloud D to be automatically provisioned in a fast and repeatable manner. This is not possible with known DR procedures as it is necessary for this information to be continuously updated, provided at DR and used manually if like-for-like server configuration is to be maintained. Although building the replacement server system with the same configuration as the original server system is not essential for creating a replacement system that functions at a basic level, it is highly preferable for the configuration to be maintained so that the performance of the replacement server system is the same as expected for the original server system.

The DR system according to embodiments is also very flexible. The recovery capsules ensure that an entire DR plan is stored in the DR portal. However, the recovery plan need not be invoked in its entirety and can be tested and invoked in parts on an hourly basis.

A further advantage is that the cost of a DR service is a lot lower to organisations. Embodiments allow a charging model that is in direct contrast with that of known DR providers who typically charge on an annual (often multi-year) contract with limited "testing" days. Such a contract may never be invoked and the limited testing days means the majority of servers are never recovery tested. Instead, the charging model provided by embodiments charges users by the hour for cloud-based DR services. The costs of a cloud recovery are passed on directly to the end user. The DR portal charging module can optionally add on a flat fee for recovery testing or a percentage uplift on the cloud provider charges.

FIG. 3 shows a computer implemented process for performing recovery for a customer server system, that has an associated backup of server system data of the customer server system, according to the first embodiment.

In step 301, the process begins.

In step 303, a server recovery request for a rebuild of at least part of the customer server system is received at a portal.

In step 305, a request is sent from the portal to a cloud-based data centre for on-demand provisioning of cloud-based server resources, wherein the request includes information on the location of at least part of the backup of the server system data to enable the deployment of a rebuild of at least part of the customer server system at the cloud-based data centre.

In step 307, the process ends.

FIG. 4 shows a computer implemented process for performing recovery for a customer server system, that has an associated backup of server system data of the customer server system, according to the first embodiment.

In step 401 the process begins.

In step 403, a server recovery request for a rebuild of at least part of the customer server system is sent to a portal.

In step 405, a request for at least some of the backup server system data is received from a cloud-based data centre for on-demand provisioning of cloud-based server resources.

In step 407, in response to receiving the request from the cloud-based data centre, a copy of the requested backup server system data is sent to the cloud-based data centre to enable the deployment, at the cloud-based data centre, of a rebuild of at least part of the customer server system.

In step 409, the process ends.

FIG. 5 shows a computer implemented process for performing recovery for a customer server system, that has an associated backup of server system data of the customer server system, the process being performed by a cloud-based data centre for on-demand provisioning of cloud-based server resources, according to the first embodiment.

In step 501, the process begins.

In step 503, a request for a rebuild of at least part of the customer server system is received, wherein the request includes information on the location of at least part of the backup of the server system data.

In step 505, in dependence on information obtained from the received request, a request is sent for at least some of the backup of server system data.

In step 507, the requested backup of server system data is received.

In step 509, at least part of the customer server system is rebuilt, at the cloud-based data centre, in dependence on the received backup of server system data and the information in the received request.

In step 511, the process ends.

According to a second embodiment, an organisation does not have their own server systems but instead uses cloud server systems. The backing-up may be to a backup system in the same cloud server system or to different cloud server system. The replacement server system that is created during a DR operation may also be in the same or a different cloud.

The only difference between the first and second embodiments is that in the second embodiment the location of the main server system that is backed up is in the cloud rather than onsite at an organisation. In all other respects, the second embodiment operates as described for the first embodiment.

According to a third embodiment, organisations have both a main server system and a backup server system. Instead of data being backed from server systems in an organisation's data centre to the cloud as in the first embodiment, or for server systems in a cloud being backed up to the cloud as in the second embodiment, the third embodiment uses a replication, or "store and forward", type of approach. An organisation has their own data centres which contain multiple main server systems and a backup server system onsite. The main server systems are backed up to the local backup system. The backup system, which may be provided by e.g. TSM, copies the data to a second backup system in the cloud. The second backup system is a partial or full replica of the local backup system. To reduce the amount of data being transferred from the source backup system to the cloud backup system, the source backup data is deduplicated. The deduplication ensures that only data that is not already available is replicated. Data that already exists on the cloud backup system is not sent to the cloud backup system again.

The cloud backup system of the third embodiment is equivalent to Cloud A, as shown in FIGS. 1 and 2, and operates, together with a DR portal and other cloud-based data centres, in the same manner as described for the first embodiment.

The third embodiment provides the advantage of an organisation having the benefit of fast backups locally to a backup system, fast restores locally from a backup system and an offsite (disk based) copy of the backed up data in the cloud which can be used for DR purposes as described for the first embodiment.

The first, second and third embodiments only differ in how an organisation's main server system is provided with a cloud-based backup system. The second and third embodiments provide substantially the same advantages to those as described for the first embodiment as they both have the previously described DR portal. The DR portal allows flexible DR operations with on-demand use and payment of cloud-based server systems.

An advantage common to all of the embodiments that it is very easy for a user to set-up, perform and control DR operations. A computing system of a user, that may be part of an organisation's main server system or a remote computing system of a party providing DR support, is in communication with the DR portal. The user operates through a user interface of their computing system in order to perform the DR operations.

Only a single application is required for supporting the user interface for controlling the DR operations. A user first enters the details of their desired DR operation, which can be to generate a replacement server system for all or any part of an organisation's server systems. The user is then clearly presented with a selection of cloud-based server systems that are available for providing the desired service on an on-demand basis and their associated costs. The user then selects one of the cloud-based server systems for use. The user selection may be subject to constraints applied by the user. For example, the user may specify a maximum use time of the selected cloud-based server system in order to limit the cost of a DR test. This user's selection is then communicated to the DR portal that proceeds to rebuild part of an organisation's server system in a cloud-based server system as requested by the user. Throughout the rebuilding process, the user may be presented with real-time status reports of the progress of the rebuild.

The automated obtaining of required data by the DR portal greatly simplifies the actions of the user. The user can easily specify the details of DR operations at a high level and lower level operations, such as determining specific location and configuration data for the selected server systems, are performed automatically without this data being entered manually by user. A user can perform all of the DR operations through the same single application without ever having to directly use a separate application for operating with the cloud-based server system that is performing the rebuild.

Figure 9:
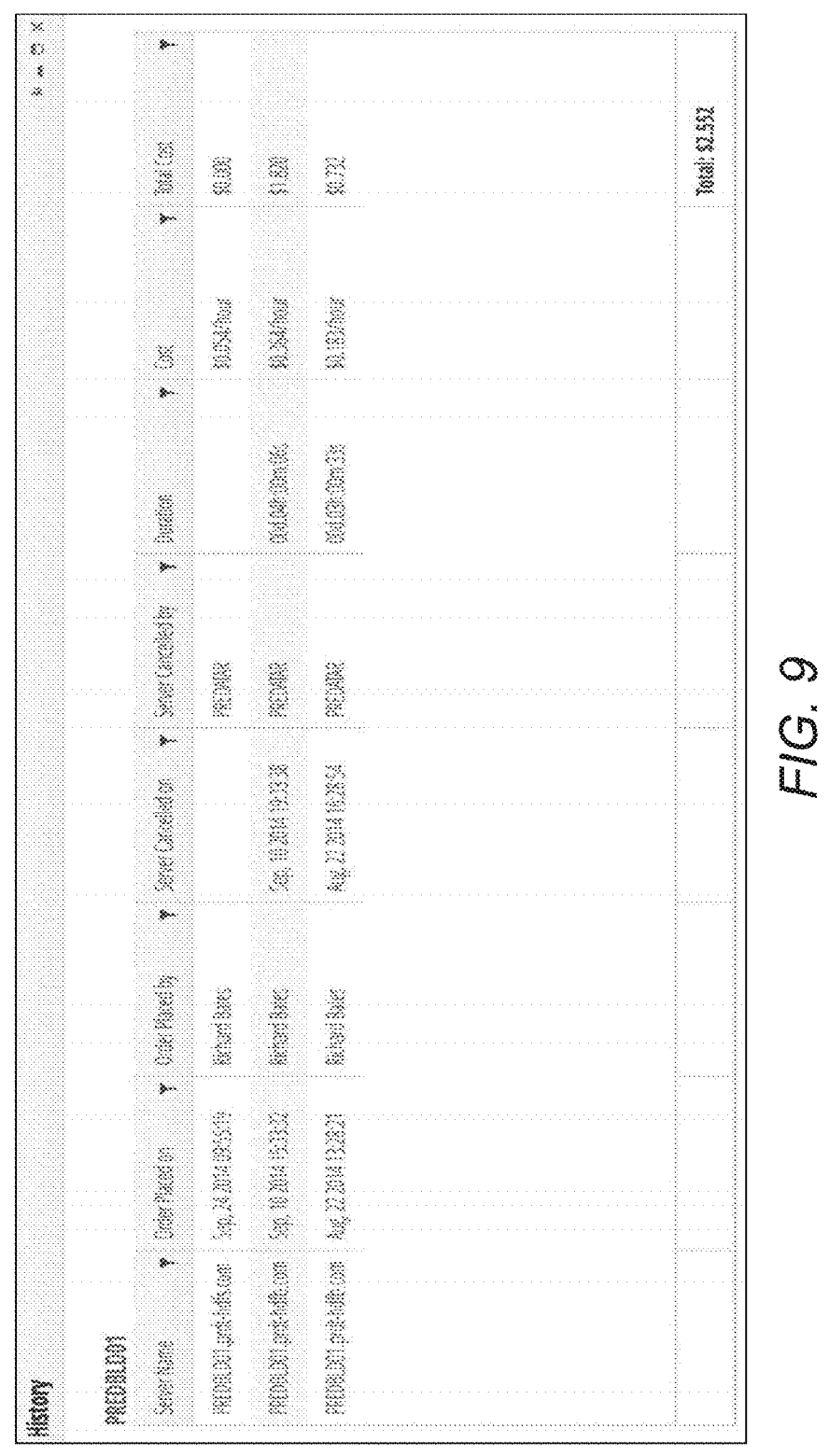

FIGS. 6 to 9 show exemplary screenshots of a user interface as presented to a user during DR operations according to an embodiment of the invention.

FIG. 6 is a screenshot of the home page that a user is presented with. The home page provides the user with a display of summary statistics for backup operations of an organisation's main server systems. Any server system that has been backed up can be subsequently recovered.

FIG. 9 is a screenshot of a recovery history screen showing the previous recoveries of a server.

Figure 1:
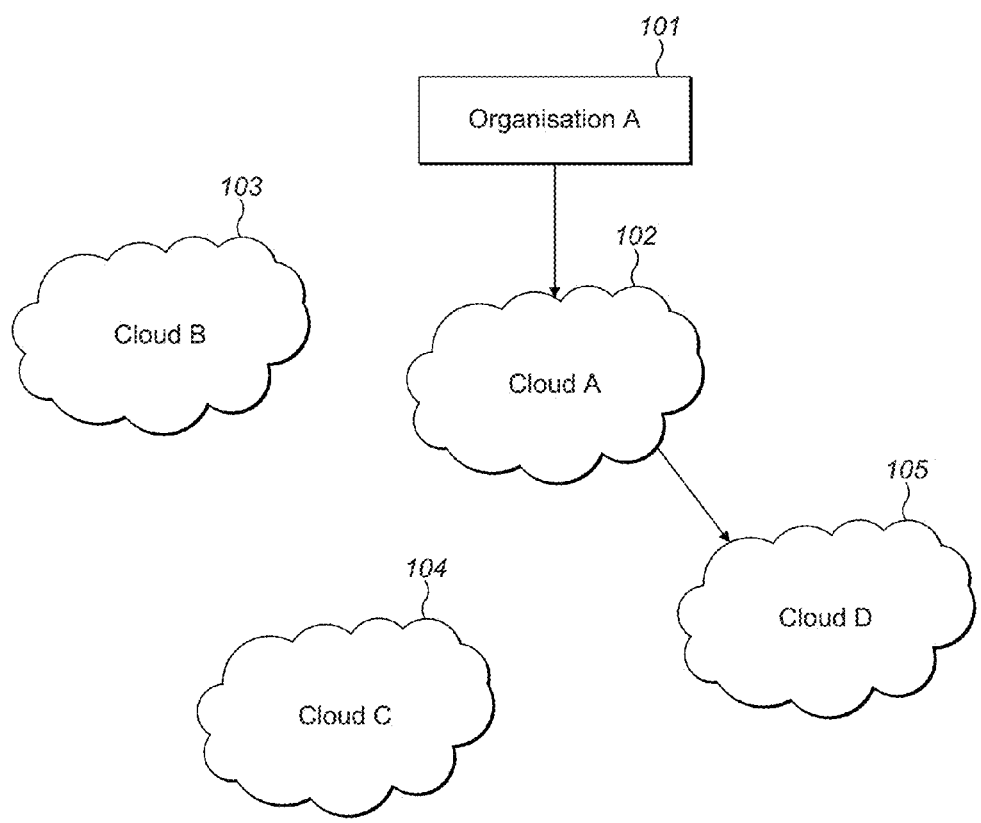
Figure 2:
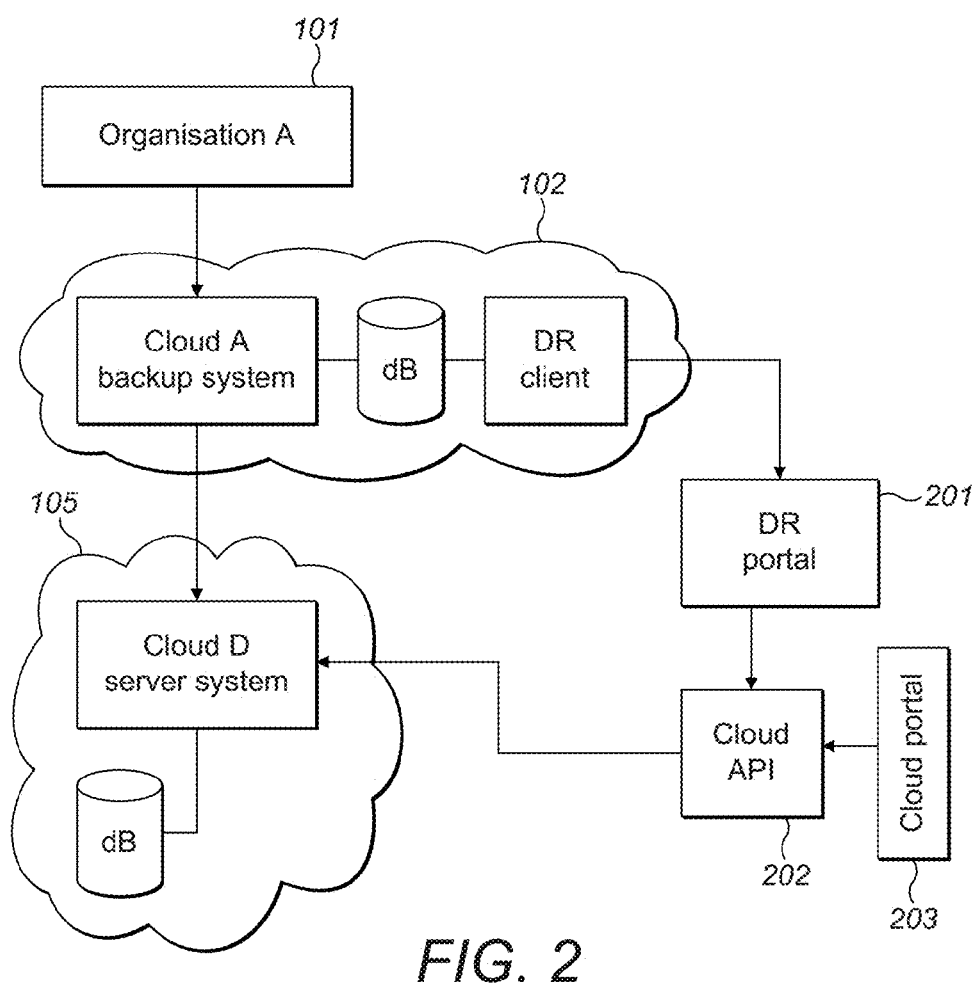
Figure 3:
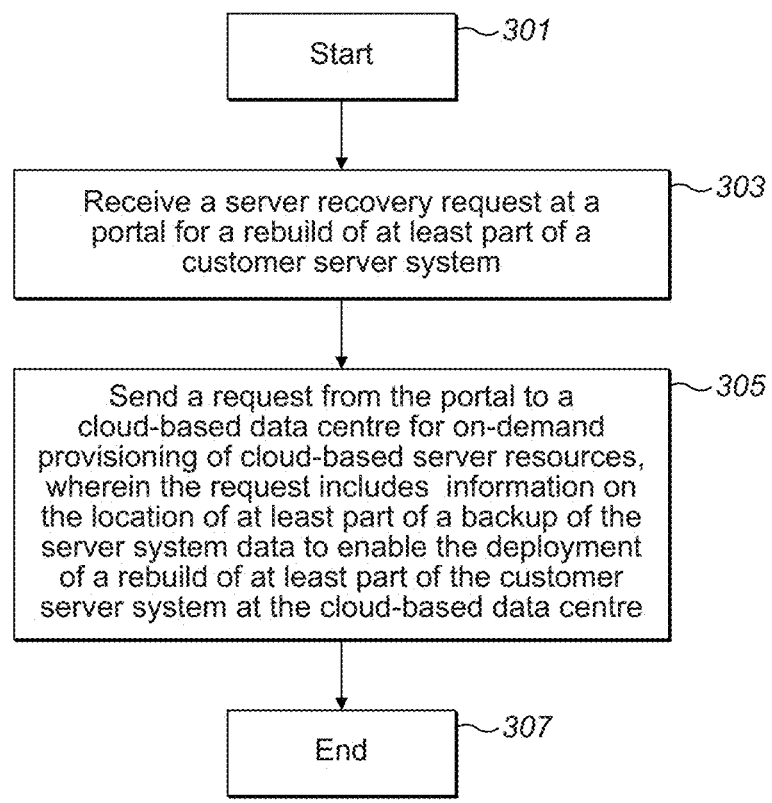
Figure 4:
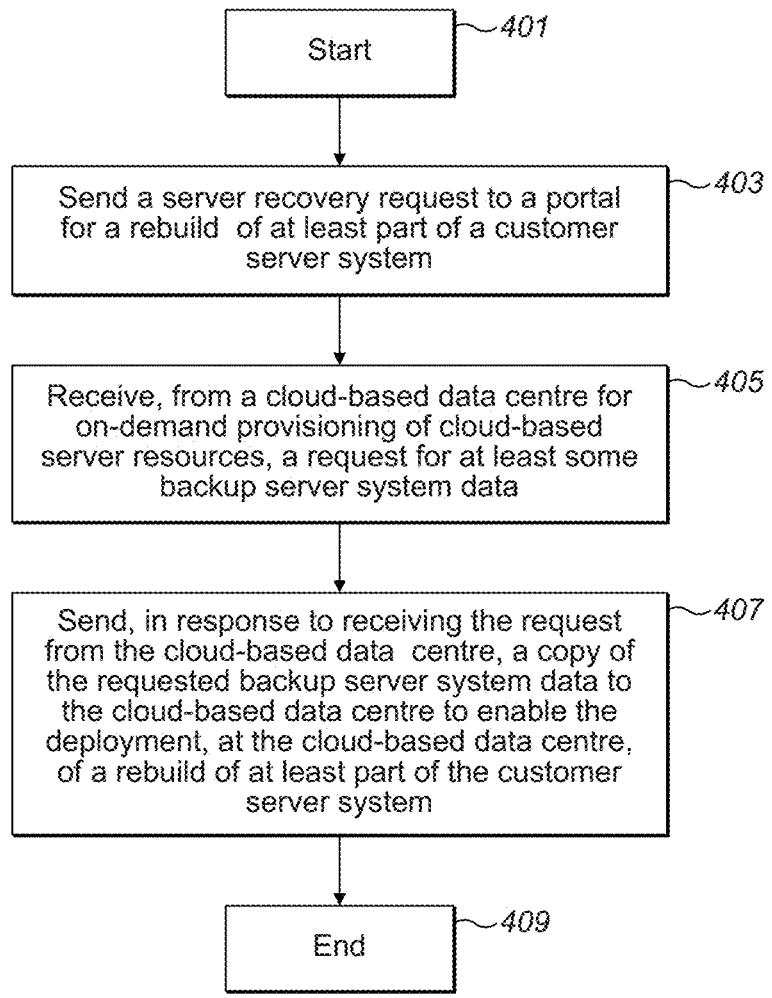
Figure 5:
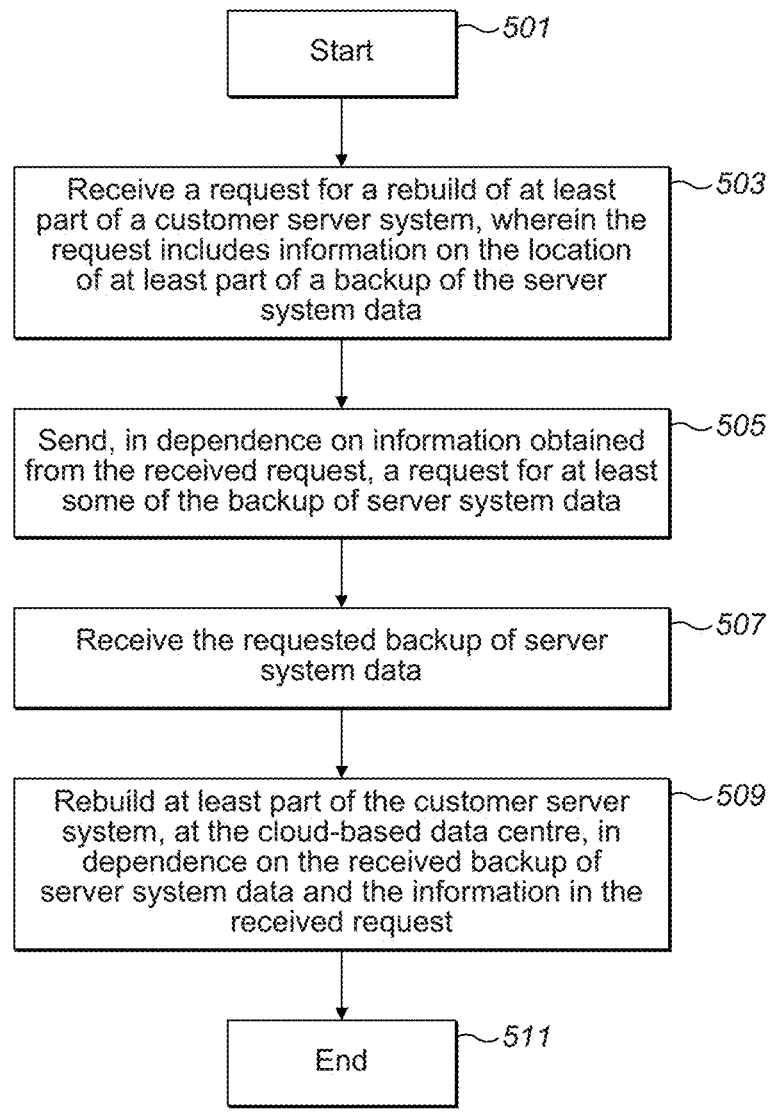
Figure 6:
Figure 7:
FIG. 7 is a screenshot of the recovery page that can be selected from the home page. The recovery page show that a recovery operation is currently in-flight.
Figure 8:
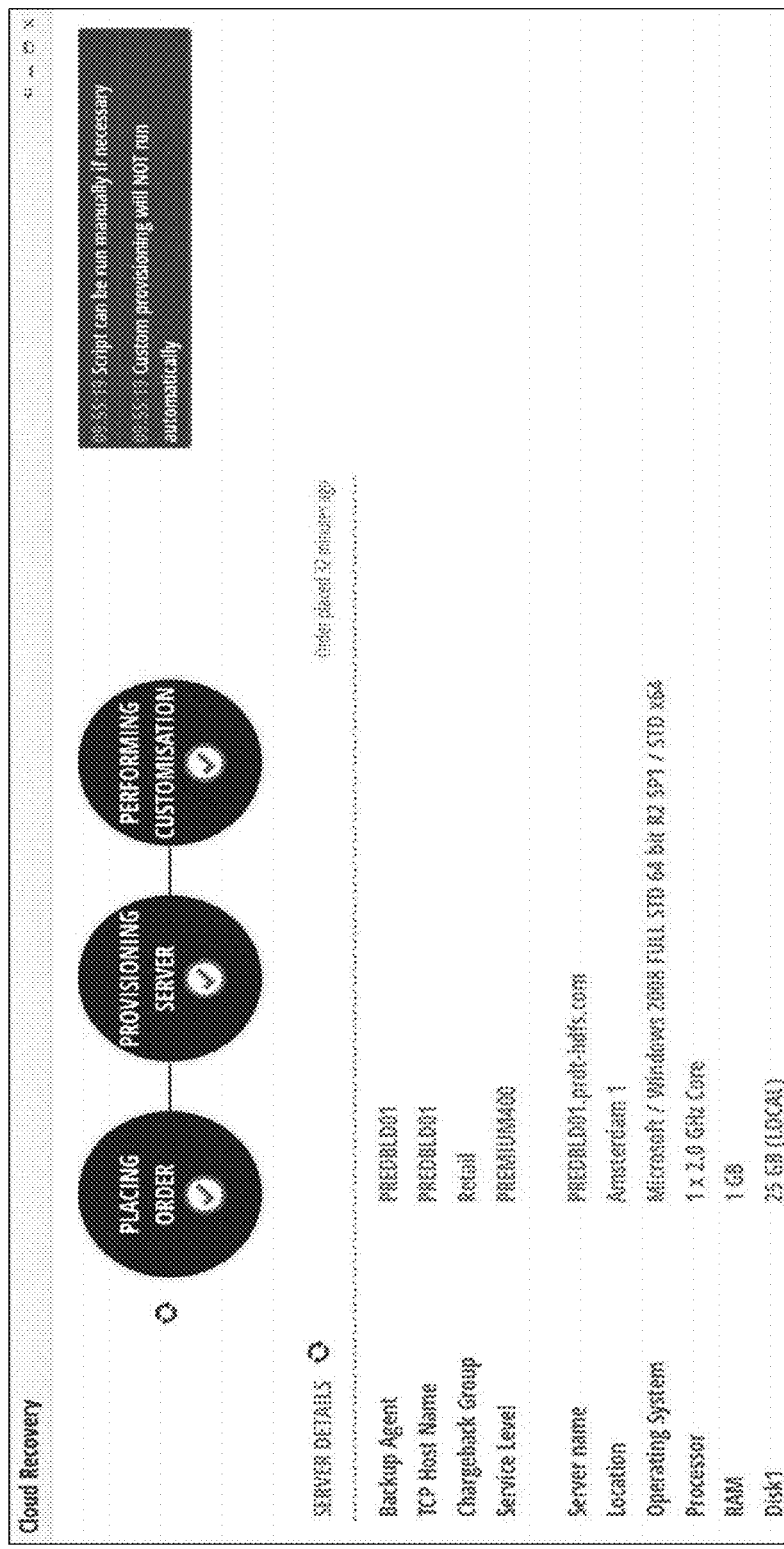
FIG. 8 is a screenshot of a display of recovery details. The display informs the user that an order has been placed, the server has been provisioned and that the customisation/provisioning script was downloaded to the server but not automatically run (it could have alternatively been configured to automatically run the customisation/provisioning script).

Accordingly, not only can a user easily set-up and perform DR operations, but the user is also provided with a historical record of DR operations.

Embodiments also include a number of modifications and variations to the implementations of embodiments as described above.

The provided recovery may be to any location where server resources can be provisioned automatically via a command line, web service call, API or any other suitable technique. For example, the recovery may be to a customer data centre, rather than a cloud provider, if a backup system is provided there.

Embodiments also include multiple independent organisations sharing the same backup system. For example, the cloud-based backup system (i.e. Cloud A) of the first and second embodiments could simultaneously provide the backup systems of a plurality of organisations.

Embodiments also include a single DR portal providing the DR support of embodiments to a plurality of otherwise separate server systems of a plurality of organisations.

In the above-described embodiments, a DR portal determines a plurality of cloud-based data centres available for use in a DR operation and one of these is selected for use. Embodiments also include more than one of the plurality of cloud-based data centres being selected and server systems in more than one cloud-based data centre being built during a DR operation.

Preferably, each backed up server system is linked to a service level (e.g. platinum, gold, silver, bronze) which documents the type, costs and level of service provided by the provider of the backup system. This service level information may also be contained in a recovery capsule for the server system.

The service level information for each server system may be obtained by the DR portal as additional information that is automatically or manually provided to the DR portal and/or included in a request for a server rebuild that is received at the portal. Each backed up server system may also belong to a group of one or more server systems. A group of backed up server systems may relate to a business application or division within an organisation. For example, the groups of an organisation may be retail, merchandising and warehousing. Each backed up server system may belong to a single server system group. Through the DR portal, a user can initiate a recovery of any single server system or, alternatively, more than one server system at a time, by selecting one or more groups and one or more service levels. For example, a user could initiate a cloud recovery of all RETAIL and MERCHANDISING server systems in the BRONZE service level. If multiple server system recoveries are initiated at the same time, then the server systems on a higher-level service level would take precedence when it comes to resources. The DR would therefore prioritise its operations so as to instruct the rebuild of server systems with higher service levels over those with a lower service levels. Alternatively, or in addition, the service level associated with each server system being rebuilt is sent by the DR portal to the cloud-based data centre that is building the replacement server system. The cloud-based data centre then uses the service levels to prioritise its operations such that the rebuilding of server systems with higher service levels is prioritised over those with lower service levels. The improved service provided by the higher service levels would be reflected by higher charges to an organisation for providing the DR service.

Embodiments also include pre-emptively commencing the rebuild of all or part of a server system in a cloud provider when a monitoring agent of an organisation's main server system detects that the main server system has, or is likely to, suffer a problem. For example, if the monitoring agent detects that a potential fault may occur that is serious enough to require rebuilding all or part of the an organisation's server system, such as it is detected that a server has gone offline or a disk is suffering I/O errors, then it may automatically recover the server, and optionally other servers in the same server group, in a cloud provider as a precautionary measure. The rebuilt servers may be on standby and only used if the part of the main server system actually fails.

The flowcharts and description thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A computer implemented method of performing recovery for a customer server system that has an associated backup of server system data of the customer server system, the method comprising the steps of:

receiving a server recovery request at a portal for a rebuild of at least part of the customer server system, wherein the source of the received request is a cloud-based backup system of the customer server system, the cloud-based backup system comprising the backup of server system data; and sending a request from the portal to a cloud-based data center for on-demand provisioning of cloud-based server resources, wherein the request includes information on the location of at least part of the backup of the server system data to enable the deployment of a rebuild of at least part of the customer server system at the cloud-based data center, said rebuild of at least part of the customer server system at the cloud-based data center not comprising a transfer of backed up data of said at least part of the customer server system via said portal; and wherein the cloud-based data center is remote from the cloud-based backup system.

2. The method according to claim 1, wherein the received server recovery request comprises the metadata of the backup of server system data and/or a provisioning script for building at least part of a replacement server system.

3. The method according to claim 1, wherein the portal is remote from the source of the received request and the cloud-based data center.

4. The method according to claim 1, wherein the customer server system is a cloud-based server system.

5. The method according to claim 1, wherein said step of sending a request from the portal to a cloud-based data center comprises sending the request to the cloud-based data center via an API of a cloud provider of the cloud-based data center.

6. The method according to claim 1, further comprising determining, by the portal, a plurality of cloud-based data centers for providing cloud-based services.

7. The method according to claim 6, further comprising sending, by the portal to the source of the received request, identification information of each of the determined cloud-based data centers.

8. The method according to claim 7, further comprising receiving, by the portal from the source of the received request, data identifying one of the determined cloud-based data centers; and determining to send said request from the portal to a cloud-based data center to said identified one of the determined cloud-based data centers.

9. The method according to claim 1, wherein:
the customer server system comprises a plurality of groups of server systems, each group of server systems comprising one or more server systems; and
said received server recovery request at the portal for a rebuild of at least part of the customer server system is a request for a rebuild of only the server systems in a selected one or more of the groups.

10. The method according to claim 1, wherein the customer server system comprises one or more server systems with each server system having an associated service level; the method further comprising:
obtaining, by the portal, the service levels of all of the one or more server systems identified in the received server recovery request at the portal for a rebuild of at least part of the customer server system; and
rebuilding said at least part of the customer server system in dependence on the obtained service levels such that the rebuilding of a server system with a higher service level is prioritized over the rebuilding of a server system with a lower service level.

11. A portal that is a computing system configured to perform the method of claim 1.

12. A computer implemented method of performing recovery for a customer server system that has an associated backup of server system data of the customer server system, the method comprising the steps of:
sending a server recovery request to a portal for a rebuild of at least part of the customer server system;

receiving, from a cloud-based data center for on-demand provisioning of cloud-based server resources, a request for at least some of the backup server system data; and
sending, in response to receiving the request from the cloud-based data center, a copy of the requested backup server system data to the cloud-based data center to enable the deployment, at the cloud-based data center, of a rebuild of at least part of the customer server system, wherein said copy of the requested backup server system data is not sent to the cloud-based data center via said portal;

wherein said steps of sending a server recovery request to a portal, receiving a request for at least some of the backup server system data and sending a copy of the requested backup server system data to the cloud-based data center, are performed by a cloud-based backup system of the customer server system, the cloud-based backup system comprising the backup of server system data; and wherein the cloud-based data center is remote from the cloud-based backup system.

13. The method according to claim 12, wherein the sent server recovery request comprises the metadata of the backup of server system data and/or a provisioning script for building at least part of a replacement server system.

14. The method according to claim 12, wherein the customer server system is remote from the portal and the cloud-based data center.

15. The method according to claim 12, wherein the customer server system is a cloud-based server system.

16. The method according to claim 12, further comprising receiving, from the portal, identification information of each of a plurality of cloud-based data centers for providing cloud-based resources.

17. The method according to claim 16, further comprising sending, to the portal, data identifying one of the plurality of cloud-based data centers.

18. The method according to claim 12, wherein the customer server system comprises a plurality of groups of server systems, each group of server systems comprising one or more server systems, the method further comprising receiving a selection of one or more of the groups;
wherein said sending of a server recovery request to a portal for a rebuild of at least part of the customer server system is a sending of a server recovery request for a rebuild of only the server systems in said selected one or more of the groups.

19. The method according to claim 12, wherein the customer server system comprises one or more server systems with each server system having an associated service level; the method further comprising:
providing, by the customer server system and/or a backup system comprising the backup of server system data, the service levels of all of the one or more server systems to be rebuilt by the cloud-based data center to the portal and/or cloud-based data center.

20. The method according to claim 12, further comprising:
determining that a fault may potentially occur within at least part of the customer server system;
determining that a rebuild of said at least part of the customer server system is required in dependence on the determination that a fault may potentially occur; and
generating a server recovery request for the rebuilding of said determined at least part of the customer server system;

wherein said sending of a server recovery request to a portal for a rebuild of at least part of the customer server system is the sending of said generated server recovery request for the rebuilding of said determined at least part of the customer server system.

21. A cloud-based backup system of a customer server system configured to perform the method of claim 12.

22. A computer implemented method of performing recovery for a customer server system that has an associated backup of server system data of the customer server system, the method comprising a cloud-based data center for on-demand provisioning of cloud-based server resources performing the steps of:
receiving, from a portal, a request for a rebuild of at least part of the customer server system, wherein the request includes information on the location of at least part of the backup of the server system data;
sending, in dependence on information obtained from the received request, a request for at least some of the backup of server system data;
receiving the requested backup of server system data, wherein the requested backup of server system data is not received via the portal; and
rebuilding at least part of the customer server system, at the cloud-based data center, in dependence on the received backup of server system data and the information in the received request;
wherein said step of sending a request for at least some of the backup of server system data comprises sending the request to a cloud-based backup system of the customer server system, the cloud-based backup system comprising the backup of server system data; and
wherein the cloud-based data center is remote from the cloud-based backup system.

23. The method according to claim 22, wherein said received request for a rebuild of at least part of the customer server system is sent from a portal remote from the cloud-based data center and received via an API of a cloud provider of the cloud-based data center.

24. The method according to claim 22, wherein the received request for a rebuild of at least part of the customer server system comprises the metadata of the backup of server system data and/or a provisioning script for building at least part of a replacement server system.

25. The method according to claim 22, wherein:
the customer server system comprises a plurality of groups of server systems, each group of server systems comprising one or more server systems; and
said received request for a rebuild of at least part of the customer server system is a request for a rebuild of only the server systems in a selected one or more of the groups.

26. The method according to claim 22, wherein the customer server system comprises one or more server systems with each server system having an associated service level; the method further comprising:
the cloud-based data centre rebuilding said at least part of the customer server system in dependence on the service level(s) of the one or more server systems being rebuilt such that the rebuilding of a server system with a higher service level is prioritized over the rebuilding of a server system with a lower service level.

27. A cloud-based server system configured to perform the method of claim 22.

28. A computer implemented method of performing recovery for a customer server system that has an associated backup of server system data of the customer server system, the method comprising:
a cloud-based backup system of a customer server system performing the method of any of claim 12;
a portal performing the method of claim 1; and
a cloud-based server system performing the method of claim 22 wherein the cloud-based data center is remote from the cloud-based backup system.

29. A system for performing recovery for a customer server system that has an associated backup of server system data of the customer server system, the system comprising:
a backup system of a customer server system as set out in claim 21;
a portal as set out in claim 11; and
a cloud-based server system as set out in claim 27;
wherein the cloud-based data center is remote from the cloud-based backup system.

* * * * *